US010611782B2

(12) United States Patent
Kreczinski et al.

(10) Patent No.: US 10,611,782 B2
(45) Date of Patent: Apr. 7, 2020

(54) PROCESS FOR PREPARING ISOCYANATES CONTAINING ALKOXYSILANE GROUPS

(71) Applicant: Evonik Degussa GmbH, Essen (DE)

(72) Inventors: Manfred Kreczinski, Herne (DE); Stephan Kohlstruk, Gladbeck (DE); Emmanouil Spyrou, Schermbeck (DE); Dirk Hoppe, Nottuln (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/356,026

(22) Filed: Mar. 18, 2019

(65) Prior Publication Data

US 2019/0300551 A1 Oct. 3, 2019

(30) Foreign Application Priority Data

Mar. 28, 2018 (EP) .................... 18164576

(51) Int. Cl.
| | | |
|---|---|---|
| *C07F 7/18* | (2006.01) | |
| *B01D 3/14* | (2006.01) | |
| *C07F 7/10* | (2006.01) | |
| *B01J 31/02* | (2006.01) | |

(52) U.S. Cl.
CPC ............ *C07F 7/1892* (2013.01); *B01D 3/143* (2013.01); *C07F 7/10* (2013.01); *C07F 7/1804* (2013.01); *B01J 31/0204* (2013.01); *B01J 31/0244* (2013.01)

(58) Field of Classification Search
None
See application file for complete search history.

(56) References Cited

U.S. PATENT DOCUMENTS

| 3,598,852 | A | | 8/1971 | Berger |
| 3,821,218 | A | * | 6/1974 | Berger .................. C07F 7/0892 544/221 |
| 4,654,428 | A | | 3/1987 | Kurashima et al. |
| 4,697,009 | A | | 9/1987 | Deschler et al. |
| 5,218,133 | A | | 6/1993 | Pepe et al. |
| 5,393,910 | A | | 2/1995 | Mui et al. |
| 5,616,762 | A | | 4/1997 | Kropfgans et al. |
| 5,886,205 | A | | 3/1999 | Uchida et al. |
| 6,008,396 | A | | 12/1999 | Sheridan et al. |
| 9,309,271 | B2 | | 4/2016 | Simandan et al. |
| 9,663,539 | B2 | | 5/2017 | Vu et al. |
| 9,862,673 | B2 | | 1/2018 | Rüfer et al. |
| 9,868,702 | B2 | | 1/2018 | Rüfer et al. |
| 10,093,605 | B2 | | 10/2018 | Bajus et al. |
| 10,093,765 | B2 | | 10/2018 | Stache et al. |
| 10,093,826 | B2 | | 10/2018 | Stache et al. |
| 10,125,089 | B2 | | 11/2018 | Kohlstruk et al. |
| 10,160,717 | B2 | | 12/2018 | Rüfer et al. |
| 10,173,979 | B2 | | 1/2019 | Rüfer et al. |
| 10,214,612 | B2 | | 2/2019 | Langkabel et al. |
| 10,221,277 | B2 | | 3/2019 | Langkabel et al. |
| 2012/0130103 | A1 | | 5/2012 | Stanjek et al. |
| 2017/0298003 | A1 | | 10/2017 | Rittsteiger et al. |
| 2017/0320896 | A1 | * | 11/2017 | Stanjek ............... B01J 31/0212 |
| 2017/0355810 | A1 | | 12/2017 | Langkabel et al. |
| 2017/0369626 | A1 | | 12/2017 | Stache et al. |
| 2017/0369736 | A1 | | 12/2017 | Stache et al. |
| 2018/0155515 | A1 | | 6/2018 | Spyrou et al. |
| 2018/0312713 | A1 | | 11/2018 | Spyrou et al. |
| 2018/0327538 | A1 | | 11/2018 | Lomölder et al. |
| 2018/0339959 | A1 | | 11/2018 | Rittsteiger et al. |

FOREIGN PATENT DOCUMENTS

| DE | 35 24 215 A1 | 1/1987 |
| DE | 35 44 601 C2 | 11/1992 |
| EP | D 709 392 B1 | 5/2001 |
| EP | 2 455 385 A1 | 5/2012 |
| WO | 2007/037817 A2 | 4/2007 |

OTHER PUBLICATIONS

Nishikubo et al., Macromolecules 1994, 27, 7240-7247. (Year: 1994).*
European Search Report dated Sep. 11, 2018 in EP 18164576.3 (5 pages).
Kreczinski et al., U.S. Appl. No. 16/354,349, filed Mar. 15, 2019.
Kreczinski et al., U.S. Appl. No. 16/354,753, filed Mar. 15, 2019.
Kreczinski et al., U.S. Appl. No. 16/356,081, filed Mar. 18, 2019.
Rüfer et al., U.S. Appl. No. 16/177,863, filed Nov. 1, 2018.

* cited by examiner

*Primary Examiner* — Clinton A Brooks
*Assistant Examiner* — Kofi Adzamli
(74) *Attorney, Agent, or Firm* — Nexsen Pruet PLLC; Philip P. McCann

(57) ABSTRACT

The invention relates to a process for preparing isocyanate containing alkoxysilane groups, in which, in the sequence of steps A) to D), A) haloalkylalkoxysilane is reacted with metal cyanate and alcohol to give alkoxysilanoalkylurethane, B) alkoxysilanoalkylurethane is freed of low boilers, solids, salt burdens and/or high boilers and optionally purified, C) alkoxysilanoalkylurethane obtained after B) is thermally cleaved to release isocyanate containing alkoxysilane groups and by-product, leaving bottoms material, and D) isocyanate containing alkoxysilane groups and by-product are separated from one another and from cleavage bottoms material and collected, wherein the process regime at least of steps C) to D) is continuous.

20 Claims, No Drawings

PROCESS FOR PREPARING ISOCYANATES CONTAINING ALKOXYSILANE GROUPS

CROSS REFERENCE TO RELATED APPLICATIONS

This application is a 35 U.S.C. § 119 patent application which claims the benefit of European Application No. 18164576.3 filed Mar. 28, 2018, which is incorporated herein by reference in its entirety.

FIELD

The invention relates to a process for preparing isocyanates containing alkoxysilane groups.

BACKGROUND

Isocyanates containing alkoxysilane groups are usable in a versatile manner as heterofunctional units and may find use, for example, in coatings, sealants, adhesives and elastomer materials, but are not limited to these fields of use.

Processes for preparing isocyanates containing alkoxysilane groups are known. For example, they can be obtained by reacting alkoxysilanoalkylamines with phosgene in the presence of tertiary amines (DE 35 44 601 C2, U.S. Pat. No. 9,309,271 B2), although not only the toxicity of phosgene but also the formation of chlorinated by-products and salts is disadvantageous.

Alternatively, access to isocyanates containing alkoxysilane groups can also be achieved via hydrosilylation of isocyanates containing olefin groups in the presence of precious metal catalysts (EP 0 709 392 B1). Disadvantages here are generally inadequate selectivity and high catalyst demand.

U.S. Pat. No. 5,218,133 A describes a route to preparation of alkoxysilanoalkylurethanes that avoids the troublesome formation of stoichiometric amounts of salt. For this purpose, alkoxysilanoalkylamines are reacted with alkyl carbonates in the presence of basic catalysts, especially in the presence of metal alkoxides, and the reaction mixture is then neutralized. The alkoxysilanoalkylurethanes obtained can be thermally cleaved to give silyl organoisocyanates and are converted further in the presence of a trimerization catalyst to isocyanurates.

Alternatively, the deactivation of the basic catalyst in the reaction mixture can also be conducted with halogenated neutralizing agents (WO 2007/037817 A2). However, these have the disadvantage of leading, in the cleavage reaction for preparation of the isocyanates described hereinafter, to highly corrosive halogenated substances and neutralization products that make very high demands on the reactor materials and hence increase capital costs and maintenance costs.

A further route to alkoxysilane-containing isocyanates leads via the reaction of haloalkylalkoxysilanes with metal cyanates to form alkoxysilanoalkylurethanes and subsequent thermal cleavage of the urethanes to release the corresponding isocyanates (U.S. Pat. Nos. 3,598,852 A, 3,821,218 A). Even though the formation of salt is disadvantageous here in principle, this is outweighed by the advantage based on the good availability of the haloalkylalkoxysilanes used. A synthesis via N-silylpropyl-N'-acylureas (DE 35 24 215 A1) is comparatively more complex.

U.S. Pat. No. 5,393,910 A describes a process for thermal cracking of alkoxysilanoalkylurethanes prepared preferably according to U.S. Pat. No. 5,218,133 A at high temperature in the gas phase. A disadvantage of this process is the need for special equipment which is stable to high temperature and thus costly. Moreover, patents that do not relate specifically to silanoisocyanates report that the high temperature required leads to reactor carbonization. This is disadvantageous because it is detrimental to plant availability.

As an alternative to urethane cleavage in the gas phase, the thermally induced release of isocyanates containing alkoxysilane groups can also be conducted in a dilute manner in inert solvents (see U.S. Pat. Nos. 5,886,205 A, 6,008,396 A). This involves adding the alkoxysilanoalkylurethane to the inert solvent and choosing a sufficiently high temperature for the solvent as to promote urethane cleavage on the one hand but to avoid unwanted side reactions as far as possible on the other hand. U.S. Pat. No. 5,886,205 A discloses, for the reaction performable in a batchwise or continuous manner, pH values of less than 8, temperatures of not more than 350° C. and a catalyst comprising at least one metal selected from Sn, Sb, Fe, Co, Ni, Cu, Cr, Ti and Pb or at least one metal compound comprising these metals. Disadvantages are the expenditure required for solvent cleaning by comparison with gas phase cleavage, and the unavoidable loss of solvent.

U.S. Pat. No. 9,663,539 B2 describes a process for preparing alkoxysilanoalkylurethanes and subsequently thermally cleaving them with the aim of obtaining light-colored isocyanates containing alkoxysilane groups with high storage stability. What is disclosed is a process for preparing isocyanatoorganosilanes, in which a) an aminoorganosilane is reacted with an organic carbonate ester in the presence of a basic catalyst to give a silyl organocarbamate, b) the pH of the mixture is adjusted to a pH of not less than 6.0 with an organic carboxylic acid, c) the mixture obtained is stripped at a temperature of 80-130° C. in order to remove alcohol formed and in order to establish a carbonate ester content of less than about 5.0% by weight, d) the mixture from c) is filtered, e) an organic carboxylic acid is optionally added in order to adjust the pH to not less than 6.0, f) the mixture obtained in d) or e) is thermally cleaved in order to obtain an isocyanatoorganosilane and corresponding by-products, g) isocyanatoorganosilane is separated from the by-products obtained in f) and h) isocyanatoorganosilane obtained in g) is collected.

Steps a) to c) can be each conducted batchwise or continuously. For step f) in particular, however, no continuous process regime is disclosed. A particular disadvantage of the process described is the lack of selectivity and hence inefficient raw material exploitation.

SUMMARY

The problem addressed by the present invention is thus that of avoiding the aforementioned disadvantages of the prior art. More particularly, the problem addressed by the present invention is that of providing a selective, resource-conserving and simple process for preparing isocyanates containing alkoxysilane groups from readily available precursors in high yields.

DETAILED DESCRIPTION

It has now been found that, surprisingly, the present problem can be solved by the process according to the invention for preparing isocyanate containing alkoxysilane groups, in which, in the sequence of steps A) to D), A) haloalkylalkoxysilane is reacted with metal cyanate and alcohol (and with release of low boilers, solids, salt burdens and/or high boilers) to give alkoxysilanoalkylurethane,
B) alkoxysilanoalkylurethane is freed of low boilers, solids, salt burdens and/or high boilers and optionally purified,
C) alkoxysilanoalkylurethane obtained after B) is thermally cleaved to release isocyanate containing alkoxysilane groups and by-product, leaving bottoms material, and
D) isocyanate containing alkoxysilane groups and by-product are separated from one another and from cleavage bottoms material and collected,
in which the process regime at least of steps C) to D) is continuous.

Here and hereinafter, a process for preparing isocyanate containing alkoxysilane groups from haloalkylalkoxysilane, metal cyanate and alcohol is understood to mean a process in which one or more haloalkylalkoxysilanes and one or more metal cyanates in the presence of one or more alcohols are first used to prepare one or more alkoxysilanoalkylurethanes, which are subsequently converted thermally to one or more isocyanates containing alkoxysilane groups and one or more by-products, especially to the alcohols used as reactant. Preferably, the process according to the invention is a process in which a haloalkylalkoxysilane, a metal cyanate and an alcohol are first used to prepare an alkoxysilanoalkylurethane, which is subsequently converted thermally to an isocyanate containing alkoxysilane groups and a by-product, especially the alcohol used originally.

The core difference in the process according to the invention from the processes disclosed in the prior art is that at least process steps C) and D) are continuous. It has been possible to date to conduct only steps A) and B) continuously, but especially not the cleavage step C). It is thus possible to perform the process in such a way that steps A) and B) are conducted batchwise and steps C) and D) continuously. It is also possible to conduct all steps A) to D) continuously. It is also conceivable to conduct just one of steps A) and B) batchwise and then to conduct steps C) and D) continuously.

Preferably, the continuous process regime of steps C) to D) is enabled here in that, in step C), the bottoms material is discharged wholly or partly from the cleavage apparatus, then subjected to thermal treatment and/or purification and/or an aftertreatment (reurethanization) in the presence of alcohol and fed back into step A), B) or C). By virtue of the bottoms material being removed and subjected to thermal treatment and/or purification and/or thermal reurethanization of isocyanates present in the bottoms material with alcohol, the high boiler content in the bottoms material is lowered and/or the proportion of values is increased. The stream removed that has been subjected to thermal treatment and/or purification and/or reurethanization is recycled into step A), B) or C) of the process. Preferably, discharge, thermal treatment and/or purification and/or aftertreatment with alcohol and feeding of the bottoms material is also conducted continuously. More preferably, the bottoms material is removed and purified and isocyanates present in the bottoms material are treated again with alcohol and the bottoms material purified is fed back into step A), B) or C). Most preferably, the bottoms material is removed and subjected to thermal treatment and purification, and the purified bottoms material is fed back into step A), B) or C).

Preference is thus given to a process for preparing isocyanate containing alkoxysilane groups, in which, in the sequence of steps A) to D), A) haloalkylalkoxysilane is reacted with metal cyanate and alcohol (and with release of low boilers, solids, salt burdens and/or high boilers) to give alkoxysilanoalkylurethane,
B) alkoxysilanoalklylurethane is freed of low boilers, solids, salt burdens and/or high boilers and optionally purified,
C) alkoxysilanoalkylurethane obtained after B) is thermally cleaved to release isocyanate containing alkoxysilane groups and by-product, leaving bottoms material, while
  i) the bottoms material is being wholly or partly discharged from the cleavage apparatus,
  ii) subjected to thermal treatment and/or purification and/or an aftertreatment/reurethanization in the presence of alcohol and
  iii) the material removed, after thermal treatment and/or purification and/or aftertreatment/reurethanization in step A), B) or C), is fed back, and
D) isocyanate containing alkoxysilane groups and by-product are separated from one another and from cleavage bottoms material and collected.

It has been found that, surprisingly, it is advantageous in the continuous preparation of isocyanates containing alkoxysilane groups from the corresponding haloalkylalkoxysilanes to free the alkoxysilanoalkylurethanes of low boilers (in particular of alcohol) and possible solids, salt burdens and high boilers after they have been synthesized by reaction of haloalkylalkoxysilanes with metal cyanates and alcohols, to subject the alkoxysilanoalkylurethanes thus purified to thermal cleavage to release the desired isocyanate containing alkoxysilane groups, to preferably continuously discharge a portion of the cleavage bottoms material from the cleavage apparatus and to subject it to a thermal aftertreatment, such that the high boiler component is reduced and the proportion of values in the mixture of matter is increased, to remove the high boiler components therefrom and to recycle the components of value into the process. It has been found that, in this way, a comparatively low steady-state concentration of high-boiling components is firstly achieved over the entire sequence of urethane synthesis, urethane purification and urethane cleavage, such that deposits, which are especially promoted by the high boiler components that are of relatively high viscosity by nature, can be avoided and good plant availability and a good process yield are ensured even over the long term. Secondly, the thermal aftertreatment—for example by reactive distillation—connected downstream of the thermal cleavage reaction has the advantage that it is surprisingly possible to achieve an additionally increased yield by comparison with the procedure without aftertreatment and more efficient raw material utilization is promoted in this way.

Preferably, the haloalkylalkoxysilane used in step A) has the formula (1)

$$R^3{}_m(OR^2)_{3-m}Si-R^1-X \tag{1}$$

where $R^3$, $R^2$ and $R^1$ are each independently a linear, branched or cyclic hydrocarbyl radical having 1-6 carbon atoms, m is 0-2 and X=F, Cl, Br or I. Preferably, m is 0 and $R^1$ is methyl or propyl, $R^2$ is methyl or ethyl and X=Cl.

The metal cyanate is preferably selected from the group of the alkali metal or alkaline earth metal cyanates. Further preferred are sodium cyanate, potassium cyanate, calcium cyanate and barium cyanate.

The alcohol used is preferably an alcohol of the formula $R^2OH$ in which $R^2$ is a linear, branched or cyclic hydrocarbyl radical having 1-6 carbon atoms.

The reaction is preferably conducted not just in the presence of alcohol but also in the presence of an aprotic solvent. Preferred aprotic solvents are dimethylformamide, dimethyl sulfoxide, dimethyl carbonate and mixtures thereof.

A catalyst need not be used, but may be employed. Preference is given to using a catalyst. The catalyst is further preferably selected from crown ethers, especially [18] crown-6, and cryptands.

Preferably, the molar ratio of haloalkylalkoxysilane and metal cyanate is less than 1:4, preferably less than 1:2. The molar ratio of haloalkylalkoxysilane to alcohol is preferably less than 1:5, preferably less than 1:3. The reaction is preferably conducted over a period of 2-20 h, preferably 4-12 h, at a temperature of 20-150° C., preferably 30-140° C. The reaction is preferably conducted at atmospheric pressure.

The conversion of the haloalkylalkoxysilane in reaction stage A) is preferably conducted by reacting haloalkylalkoxysilane of the formula (1), optionally in admixture with alkoxysilanoalkylurethanes of the formula (2) that especially originate from the bottoms material of the downstream cleavage reaction:

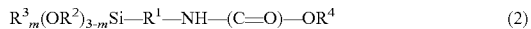

$$R^3_m(OR^2)_{3-m}Si-R^1-NH-(C=O)-OR^4 \quad (2)$$

where $R^4$, $R^3$, $R^2$ and $R^1$ are each independently a linear, branched or cyclic hydrocarbyl radical having 1-6 carbon atoms and m is 0-2,
in an aprotic solvent and in the presence of a crown ether or cryptands as catalyst, with a metal cyanate and an alcohol of the formula $R^2OH$ over the course of 2-20 h, preferably 4-12 h, at 20-150° C., preferably 30-140° C., where the molar ratio of haloalkylalkoxysilane to metal cyanate is less than 1:4, preferably less than 1:2, and the molar ratio of haloalkylalkoxysilane to alcohol is less than 1:5, preferably less than 1:3.

The optional blending of the alkoxysilanoalkylurethane into the reaction mixture may precede the start of the reaction, or else take place in the course of reaction, at a single juncture or continuously.

The reaction can be conducted in a batchwise reactor, in a continuously operated stirred tank or in a tubular reactor. Preference is given to conducting the reactor in a continuously operated stirred tank or in a tubular reactor.

In step B), low boilers, solids, salt burdens and/or high boilers are removed and the alkoxysilanoalkylurethane is optionally purified.

Preference is given to conducting the removal of the low boilers, solids, salt burdens and/or high boilers in three to four separate component steps. Further preferably, the low boilers can be removed by distillation, the solids and/or salt burdens via filtration or centrifugation, and the high boilers via thin-film evaporation. This preferably involves first filtering or centrifuging the product stream from A) for removal of solids, then removing the low boilers by distillation, then optionally removing the high boilers via thin-film evaporation and purifying alkoxysilanoalkylurethane ultimately obtained, optionally together with alkoxysilane-containing isocyanate present, via distillation and removing any residues of solvent still present.

The filtration or centrifugation is preferably conducted at temperatures of 30-90° C., further preferably at 50-70° C., most preferably at 60° C.

The filtration can be effected via membranes, adsorbers or fibre mats, by vacuum filtration or pressure filtration, within a temperature range of 30-90° C., preferably 50-70° C., more preferably at 60° C. As an alternative to filtration, the separation of solid phase and liquid phase can also be conducted with the aid of a centrifuge.

The distillative removal of the low boilers, preferably consisting of solvent and excess alcohol, is conducted preferably at temperatures of 40-200° C., further preferably at 50-180° C., most preferably at 55-75° C., under reduced pressure.

The low boilers can be removed by distillation preferably at 40-200° C., further preferably at 50-180° C., especially preferably at 55-75° C., at 20-800 mbar, preferably 40-600 mbar. The removal can be conducted in one or more stages. This can in principle be effected in batchwise mode with a distillation column placed on top, but this is preferably effected via flashing-off or by means of thin-film evaporation.

Impurities that have not been removed sufficiently by filtration or centrifugation and subsequent distillation can be removed by a further optional purification. For this purpose, the mixture is run through a short-path or thin-film evaporator at a pressure of 1-30 mbar, preferably 2-20 mbar, and at a temperature of 80-220° C., preferably 100-200° C., such that distillate and efflux are obtained in a ratio of greater than 80% by weight to 20% by weight, preferably 85% by weight to 15% by weight.

The optional thin-film evaporation of the filtrate or permeate obtained is preferably conducted at a pressure of 1-30 mbar, preferably 2-20 mbar, and a cut ratio of distillate/residue of greater than 80% by weight to 20% by weight, preferably greater than 85% by weight to 15% by weight. The residue can preferably be recycled into the urethane synthesis A) or the purification step B). Preferably, the residue is guided into the urethane synthesis A) or into the filtration/centrifugation step B) i).

The distillative purification of the product stream is preferably conducted in such a way that possible solvent residues are drawn off overhead, and alkoxysilanoalkylurethane and any isocyanate containing alkoxysilane groups present are drawn off at the side draw. Preference is given to using a distillation column for the purpose.

The thermal cleavage C) of the alkoxysilanoalkylurethane withdrawn from the side draw stream gives rise to isocyanate containing alkoxysilane groups and by-product, preferably alcohol. Preference is given to conducting the thermal cleavage without addition of solvent.

The thermal cleavage in step C) is preferably conducted in the presence of a catalyst, continuously and without solvent, at a temperature of 150 to 280° C., preferably 165 to 265° C., and under a pressure of 0.5-200 mbar, preferably 1.0-100 mbar. The catalyst concentration is preferably 0.5-100 ppm, preferably 1-60 ppm, more preferably 2-30 ppm.

In the thermal cleavage, preference is given to discharging a portion of the reaction mixture constantly from the bottom, preferably 1 to 90% by weight based on the feed, preferably 5% to 60% by weight based on the feed. Correspondingly, corresponding amounts of bottoms material are preferably discharged from the cleavage apparatus.

The thermal cleavage is preferably effected partially, meaning that the conversion of product from step B)/side draw stream to isocyanate containing alkoxysilane groups is chosen freely and is typically within a range of 10-95% by weight, preferably 20-85% by weight, of the amount supplied (feed). Preferably, a portion of the reaction mixture comprising not only unconverted urethane of the formula (2) but also high-boiling by-products and other reutilizable and unutilizable by-products is discharged continuously from the bottom. The volume of the discharge is guided by factors including the desired conversion and the desired capacity of the cleavage reaction and can easily be determined experimentally. It is typically 1% to 90% by weight, preferably 5% to 60% by weight, based on the feed.

Catalysts employed for chemical cleavage of the urethanes containing alkoxysilane groups are, for example, the inorganic and organic compounds that catalyse urethane formation. Preference is given to using chlorides of zinc or of tin and oxides of zinc, manganese, iron or cobalt, where the catalyst is metered into the stream of matter from purification step B) comprising essentially urethane, especially the stream of matter from step B) iv) and any other recycled streams before they are fed into the cleavage, in the form of a 0.01-25% by weight, preferably 0.05-10% by weight, solution or suspension in alcohol, in an amount of 0.5-100 ppm, preferably 1-60 ppm, more preferably 2-30 ppm. In principle, but not preferably, the urethane cleavage can also be conducted without added catalyst. It has been found that, surprisingly, a low catalyst concentration promotes the selectivity of the chemical conversions that take place in the cleavage bottoms in favour of the desired thermal cleavage with release of the target product, whereas both excessively high catalyst concentrations and the absence of the cleavage catalyst lead to elevated by-product formation. The optimal catalyst concentration can easily be ascertained experimentally on the basis of this observation.

Suitable cleavage apparatuses are preferably cylindrical cleavage reactors, for example tubular ovens or preferably evaporators, for example falling-film, thin-film or bulk evaporators, for example Robert evaporators, Herbert evaporators, Caddle-type evaporators, Oskar evaporators and heating cartridge evaporators.

The important factor is basically to keep the average residence time of the isocyanate groups that are inevitably released in the deblocking of the alcohol in the cleavage zone as short as possible and hence to restrict unwanted side reactions to a minimum. Preferably, the cleavage is conducted in a combined cleavage and rectification column which, for the supply of energy, is equipped at the bottom with a falling-film evaporator, in the upper part with a device for drawing off product or crude product, and at the top with a condenser for the reflux and the drawing-off of alcohol. Optionally, devices for additional energy input can also be installed in the lower third.

The cleavage products formed in the thermal cleavage, composed in particular of alcohol and isocyanate containing alkoxysilane groups, may preferably be separated by rectification at temperatures of 150-280° C., preferably 165-265° C., and a pressure of 0.5-200 mbar, preferably 1-100 mbar, in the alcohol and isocyanate containing alkoxysilane groups, where the isocyanate may possibly still contain proportions of the underlying urethane. This separation can be conducted, for example, in the cleavage column of the abovementioned combined cleavage and rectification column.

The bottoms material comprising high boilers from the cleavage apparatus, after discharge, can preferably be subjected to thermal treatment and/or purified and/or subjected to an aftertreatment in the presence of alcohol, and is then preferably fed into step A), B) or C) again. This can reduce the high boiler content and increase the proportion of values in the mixture of matter. More preferably, the bottoms material is removed and purified and isocyanates present in the bottoms material are treated again with alcohol and the bottoms material purified is fed back into step A), B) or C). Most preferably, the bottoms material is removed and subjected to thermal treatment and purification, and the purified bottoms material is fed back into step A), B) or C).

More preferably, the thermally treated and/or purified and/or alcohol-aftertreated bottoms material is fed back into step B) or C), since deposits in the urethane synthesis can then be avoided and the yields are higher.

The thermal aftertreatment is preferably effected at a temperature of 150-250° C. over a period of 0.2 to 4 h, further preferably at 190-250° C. over a period of 0.5-1.5 h at standard pressure.

The purification step is preferably effected by distillation. This is preferably done by distilling the discharged bottoms material under reduced pressure and at a temperature of 150-250° C., such that the alkoxysilanoalkyl isocyanate and/or alkoxysilanoalkylurethane formed in the bottoms is separated from the high boilers. This can be effected, for example, via thin-film evaporation. The resultant distillate can be fed to step A), B) or C) of the process. Preferably, the distillate obtained is fed to the thin-film evaporation A), B) iv) or the cleavage C).

The bottoms discharged from the cleavage stage C) contains, as well as unconverted urethane, additionally high-boiling by-products and other reutilizable and unutilizable by-products. The reutilizable component, i.e. the values component of the mixture of matter—and hence the overall yield of the process—can be increased by controlled thermal aftertreatment in combination with a distillative purification, especially by reactive distillation, of the material. The material is separated into a values stream and a waste stream, with discharge of the waste stream which is rich in high boilers from the process, which is discarded or recycled. Preferably, the workup of the bottoms material via thermal treatment and purification is a reactive distillation.

The discharged bottoms material comprising alkoxysilanoalkyl isocyanate and/or alkoxysilanoalkylurethane can further preferably, with or without a prior purification step, be subjected to an optional further aftertreatment in order to increase the values content of the mixture of matter. For this purpose, the optionally distilled bottoms material is converted in the presence of an alcohol of the formula $R^2OH$ with $R^2$=linear, branched or cyclic hydrocarbyl radical having 1-6 carbon atoms at 25-100° C. in the presence or absence of a catalyst. Useful catalysts include all solid-state catalysts that promote the NCO/OH reaction, e.g. tin octoate, dibutyltin laurate, tin dichloride, zinc dichloride or triethylamine. The molar ratio of NCO groups and OH groups is preferably up to 1:100, preferably up to 1:60 and more preferably up to 1:30. The reaction can be conducted in a batch reactor, a cascade, or else a tubular reactor in the absence or presence of a catalyst. Preference is given to conducting the reaction in a cascade or in a tubular reactor. Alkoxysilanoalkyl isocyanates formed are converted here to the corresponding urethanes ("reurethanization"). The resultant product stream can preferably be sent to the urethane synthesis A) and/or the purification step B). More preferably, the resultant product stream can be sent to the urethane synthesis A), the distillation step B) ii) and/or the distillative purification B) iv). Excess alcohol is preferably removed wholly or partly at the same time.

The steps of thermal aftertreatment and separation into values stream and waste stream and reurethanization can be conducted successively or in parallel. A batch reactor, for example, is suitable for the thermal aftertreatment, wherein the components can be separated thereafter in a distillation column or with the aid of a falling-film, short-path or thin-film evaporator, for example by recycling into the optional high boiler removal B iii). Less preferably, the separating operation can also be effected by extraction. Alternatively, the steps can also be effected in a falling-film, thin-film or short-path evaporator, and it is also possible to use multiple evaporators connected in series or in parallel.

The thermal aftertreatment can be effected in the presence or absence of typical urethanization catalysts. It is also possible to dispense with thermal aftertreatment entirely, but this measure sacrifices yield potential.

With a given capacity, for an optimized increase in the values content, the parameters of residence time and temperature in the thermal aftertreatment are among the crucial parameters, the optimum of which depends on the dimensions and basic setup of the process configuration and can easily be ascertained experimentally by the person skilled in the art.

In a particularly preferred variant of the invention, the bottoms discharge from the cleavage stage C) is subjected to thin-film evaporation at a temperature of 150-250° C., preferably 165-235° C., and a pressure of 1-40 mbar, preferably 2-20 mbar, with recycling of the distillate containing the values into the process and discharge of the efflux containing essentially high boilers from the thin-film evaporation from the process.

In step D), isocyanate containing alkoxysilane groups and by-product, preferably alcohol, is separated from bottoms material and collected. Further preferably, isocyanate containing alkoxy silane groups and by-product is separated from one another, preferably by rectification.

Further preferably, the isocyanate obtained by rectification is additionally purified and isolated by distillation ("pure isocyanate").

The isocyanate containing alkoxysilane groups which is preferably obtained by rectification can optionally be purified further by distillation at a temperature of 80-220° C., preferably 100-200° C., and under a pressure of 0.5-200 mbar, preferably 1-100 mbar, and isolated as a product of high purity. In this case too, it is preferably possible to continuously discharge a portion of distillation bottoms and combine it with the discharged bottoms material from the cleavage C).

The isocyanates preparable by the process preferably have the formula (3)

$$R^3{}_m(OR^2)_{3-m}Si-R^1-NCO \quad (3)$$

where $R^3$, $R^2$ and $R^1$ are each independently identical or different hydrocarbyl radicals having 1-6 carbon atoms, which may be branched or cyclic, or else may be integrated together to form a cyclic system, and m is 0-2. Preferably, m=0. $R^1$ is preferably propyl. $R^2$ is preferably methyl or ethyl. Very particular preference is given to compounds where m is 0 and $R^1$ is methyl or propyl, and $R^2$ is methyl or ethyl.

The process according to the invention is very particularly suitable for preparation of isocyanatopropyltrimethoxysilane and isocyanatopropyltriethoxysilane.

Advantages of the process according to the invention are in particular that isocyanates containing alkoxysilane groups can be prepared with high plant availability in continuous operation with high yields. What is advantageous about the multistage process according to the invention is particularly the fact that, when alkoxysilanoalkylamines of the formula (1) are used as starting material for the continuous preparation of isocyanates containing alkoxysilane groups, deposits that are promoted particularly by the high-boiling components that are of relatively high viscosity by nature can be largely avoided and good plant availability and a good process yield is assured even over the long term. In addition, it is an advantage of the multistage process according to the invention that it allows the process yield to be additionally increased owing to the downstream thermal aftertreatment—for example by reactive distillation—and promotes more efficient raw material utilization in this way.

The above-described optional sequence of thermal aftertreatment—for example by reactive distillation, bottoms discharge, separation into values and wastes, urethanization of the values and recycling of the reurethanized values stream into the process can in principle also be conducted in the following sequence: urethanization of the bottoms discharge, thermal aftertreatment, separation into values and wastes, and recycling into the process.

The multistage process according to the invention for continuous preparation of isocyanates containing alkoxysilane groups with recycling and discharge of the by-products can ensure a process that runs without disruption with high selectivity for a long period. The process according to the invention is suitable for preparation of isocyanates containing alkoxysilane groups and having 1-16 carbon atoms between the silicon atom and the isocyanate group, but especially for preparation of isocyanatopropyltrimethoxysilane and isocyanatopropyltriethoxysilane.

The isocyanates containing alkoxysilane groups that have been prepared are suitable for use in coatings on different substrates, sealants, adhesives and elastomer materials—or else for specific modification of resins or discrete molecules—but without being restricted to these fields of use.

The invention is elucidated in detail by the following examples:

EXAMPLE 1

Preparation of 3-(trimethoxysilyl)propyl isocyanate—Reurethanization of the Bottoms Discharge and Recycling into the Urethane Purification To a solution of 14.5 kg of chloropropyltrimethoxysilane and 6.0 kg of potassium cyanate and 5 litres of methanol in dimethylformamide were added 20 g of [18]crown-6, and the mixture was stirred under reflux at standard pressure for 9 h. The salt obtained was filtered off, and the solvent and excess methanol were largely removed by flashing-off. The residue was subjected to a fractional distillation at top pressure 2 mbar. The alkoxysilanoalkylurethane was removed at the side draw and run continuously into the circulation of the cleavage column and rectification column, and the deblocking reaction was conducted at a temperature of 192° C. and a bottom pressure of 53 mbar in the presence of a steady-state concentration of tin dichloride of 55 ppm. The cleavage gases IPMS and methanol were condensed out in two successive condensers, it being possible to reuse the methanol obtained as the top product, after further distillation, as raw material, and the IPMS (3-(trimethoxysilyl) propyl isocyanate) was withdrawn at the side draw with a purity of >98% in an amount of 11.7 kg/h, which corresponds to a continuous yield of 77%. To maintain the mass balance within the cleavage column and rectification column, and for avoidance of deposits and possibly blockage of the cleavage apparatus, and for regeneration of values, a substream was continuously discharged from the circuit, cooled down and combined with methanol, and the combined stream (8.0 kg/h) was converted in a tubular reactor at 65° C. until urethanization of all NCO groups was complete. The reurethanizate stream was recycled into the solvent separation.

EXAMPLE 2

Preparation of 3-(trimethoxysilyl)propyl isocyanate—Thermal Aftertreatment and Separation of the Bottoms Discharge and Recycling into the Urethane Cleavage To a solution of 15.8 kg of chloropropyltrimethoxysilane and 6.5 kg of potassium cyanate and 5.5 litres of methanol in dimethylformamide were added 10 g of [18]crown-6, and the mixture was stirred under reflux at standard pressure for 9 h. The salt obtained was filtered off, and the solvent and excess methanol were largely removed by flashing-off. The residue was subjected to a fractional distillation at top pressure 2 mbar. The alkoxysilanoalkylurethane was removed at the side draw and run continuously into the circulation of the cleavage column and rectification column, and the deblocking reaction was conducted at a temperature of 193° C. and a bottom pressure of 54 mbar in the presence of a steady-state concentration of tin dichloride of 28 ppm. The cleavage gases IPMS (3-(trimethoxysilyl)propyl isocyanate) and methanol were condensed out in two successive condensers that were operated at different temperature levels, it being possible to reuse the methanol obtained as the top product, after further distillation, as raw material, and the IPMS (3-(trimethoxysilyl)propyl isocyanate) was withdrawn at the side draw with a purity of >98% in an amount of 13.1 kg/h, which corresponds to a continuous yield of 79%. To maintain the mass balance within the cleavage column and rectification column, and for avoidance of deposits and possibly blockage of the cleavage apparatus, and for regeneration of values, a substream was continuously discharged from the circuit, subjected to thermal aftertreatment at 220° C. with a residence time of 55 min, and then run through a thin film evaporator at 5 mbar. The distillate stream was recycled into the circuit.

COMPARATIVE EXAMPLE

Batchwise Preparation of Isocyanatopropyltrimethoxysilane—Batchwise Deblocking To a solution of 15.0 kg of chloropropyltrimethoxysilane and 7.34 kg of potassium cyanate and 5 litres of methanol in dimethylformamide were added 22 g of [18]crown-6, and the mixture was stirred under reflux at standard pressure for 9 h. The salt obtained was filtered off, and the solvent and excess methanol were largely removed by flashing-off. The residue was subjected to a fractional distillation at top pressure 2 mbar, and 15.1 kg of urethane were obtained in this way.

378 g of the urethane were heated to a temperature of 192° C. in a 3 l round-bottom flask with distillation apparatus, stirrer and thermometer in the presence of 105 ppm of tin dichloride and at a pressure of 50 mbar. The cleavage gases formed were separated by distillation and condensed out. After 6.5 h, the experiment was stopped after no product stream was obtained any longer in the distillation. A total of 222.3 g of IPMS were obtained with a purity of 97.4% (about 66% yield); 106.9 g of high boilers remained in the round-bottom flask.

The invention claimed is:
1. A process for preparing isocyanate containing alkoxysilane groups, in which, in the sequence of steps A) to D),
    A) reacting the haloalkylalkoxysilane with metal cyanate and alcohol in the presence of a catalyst to give an alkoxysilanoalkylurethane, wherein the catalyst selected from crown ethers and cryptands,
    B) removing low boilers, solids, salt burdens and high boilers from the alkoxysilanoalkylurethane in the sequence of steps i) to iv)
        i) filtering or centrifuging the the product stream A),
        ii) removing the low boilers by distillation,
        iii) removing the high boilers by thin-film evaporation, and
        iv) purifying the oalkoxysilanoalkylurethane by distillation and removing any solvent residues,
    C) thermally cleaving the alkoxysilanoalkylurethane obtained from B) to release isocyanate containing alkoxysilane groups and by-product, leaving bottoms material, and
    D) separating the isocyanate containing alkoxysilane groups and by-product are separated from one another and from cleavage bottoms material and collected,
wherein the process regime at least of steps C) to D) is continuous.

2. The process according to claim 1, wherein in step C) is conducted while
    i) the bottoms material is being wholly or partly discharged from the cleavage apparatus,
    ii) subjected to thermal treatment and/or purification and/or an aftertreatment in the presence of alcohol and
    iii) the material removed, after thermal treatment and/or purification and/or aftertreatment in A), B) or C), is fed back.

3. The process according to claim 2, wherein the discharged bottoms material
    is subjected to thermal treatment at a temperature of 150-250° C. over a period of 0.2 to 4 h and/or
    is distilled under reduced pressure and at a temperature of 150-250° C. and/or
    is converted in the presence of an alcohol of the formula $R^2OH$ with $R^2$=linear, branched or cyclic hydrocarbyl radical having 1-6 carbon atoms at 25-100° C. in the presence or absence of a catalyst.

4. The process according to claim 3, wherein no reaction with alcohol is conducted.

5. The process according to claim 4, wherein the distillate obtained is sent to step B) or C).

6. The process according to claim 2, wherein the haloalkylalkoxysilane has the formula (1)

$$R^3_m(OR^2)_{3-m}Si\text{—}R^1\text{—}X \quad (1)$$

where
    $R^3$, $R^2$ and $R^1$ are each independently a linear, branched or cyclic hydrocarbyl radical having 1-6 carbon atoms,
    m is 0-2 and
    —X =F, Cl, Br or I.

7. The process according to claim 2, wherein the metal cyanate used is an alkali metal or alkaline earth metal cyanate.

8. The process according to claim 2, wherein the reaction is conducted in the presence of an aprotic solvent.

9. The process according to claim 2, wherein the catalyst selected from [18] crown-6 ethers and cryptands.

10. The process according to claim 2, comprising the step of
    i) centrifuging the product stream A).

11. The process according to claim 1, wherein the haloalkylalkoxysilane has the formula (1)

$$R^3_m(OR^2)_{3-m}Si\text{—}R^1\text{—}X \quad (1)$$

where
- $R^3$, $R^2$ and $R^1$ are each independently a linear, branched or cyclic hydrocarbyl radical having 1-6 carbon atoms,
- m is 0-2 and
- —X =F, Cl, Br or I.

12. The process according to claim 1, wherein the metal cyanate is an alkali metal or alkaline earth metal cyanate.

13. The process according to claim 1, wherein the reaction is conducted in the presence of an aprotic solvent.

14. The process according to claim 1, wherein the catalyst is selected from [18] crown-6 ethers.

15. The process according to claim 1,
comprising the step of
  i) centrifuging the product stream A).

16. The process according to claim 1, wherein a residue from the thin-film evaporation step B) iii) is recycled into step A) or into the step B) i).

17. The process according to claim 1, wherein step C) is conducted without solvent and in the presence of the catalyst at a temperature of 150-280° C. and a pressure of 0.5-200 mbar.

18. The process according to claim 17, wherein the catalyst concentration is 0.5-100 ppm.

19. The process according to claim 1, wherein, in step C), an amount of bottoms material corresponding to 1-90% by weight based on the feed is discharged from the bottom and added again in step A), B) or C).

20. The process according to claim 1, wherein the separation in step D) is a rectification.

* * * * *